United States Patent
Holmen

(10) Patent No.: US 10,420,277 B2
(45) Date of Patent: Sep. 24, 2019

(54) SPREADING ARRANGEMENT AND A COMBINE HARVESTER COMPRISING A SPREADING ARRANGEMENT

(71) Applicant: Rekordverken Sweden Aktiebolag, Kvanum (SE)

(72) Inventor: Bengt Holmen, Skara (SE)

(73) Assignee: Rekordverken Sweden Aktiebolag, Kvanum (SE)

( * ) Notice: Subject to any disclaimer, the term of this patent is extended or adjusted under 35 U.S.C. 154(b) by 0 days.

(21) Appl. No.: 15/736,255

(22) PCT Filed: Jun. 9, 2016

(86) PCT No.: PCT/EP2016/063154
§ 371 (c)(1),
(2) Date: Dec. 13, 2017

(87) PCT Pub. No.: WO2016/202677
PCT Pub. Date: Dec. 22, 2016

(65) Prior Publication Data
US 2018/0177127 A1    Jun. 28, 2018

(30) Foreign Application Priority Data
Jun. 17, 2015 (EP) .................................... 15172585

(51) Int. Cl.
*A01F 12/40*     (2006.01)
*A01D 41/12*     (2006.01)
*A01F 29/04*     (2006.01)

(52) U.S. Cl.
CPC .......... *A01D 41/1243* (2013.01); *A01F 29/04* (2013.01)

(58) Field of Classification Search
USPC ........................................................ 460/112
See application file for complete search history.

(56) References Cited

U.S. PATENT DOCUMENTS 4,591,102 A * 5/1986 Clarke ............... A01D 41/1243
                                               239/655
7,094,146 B2 * 8/2006 Holmen ............. A01D 41/1243
                                               460/111
(Continued)

FOREIGN PATENT DOCUMENTS

| EP | 0331784 A1 | 3/1988 |
| EP | 0631717 A1 | 1/1995 |
| EP | 2266381 A1 | 12/2010 |

OTHER PUBLICATIONS

International Search Report and Written Opinion for PCT Application No. PCT/EP2016/063154, dated Sep. 9, 2016, 11 pages.
(Continued)

*Primary Examiner* — Thomas B Will
*Assistant Examiner* — Mai T Nguyen
(74) *Attorney, Agent, or Firm* — Perkins Coie LLP

(57) ABSTRACT

The present invention relates to a spreading arrangement (10) adapted to be arranged after a combine harvester (1), said spreading arrangement comprises two spreader fans (8), two flow guides (21), and two flow diverting elements (23). An inlet (27) of each one of the two flow guides (21) are arranged in proximity to a respective one of said spreader fans (8), an outlet (28) of said flow guides (21) are provided at a distance from said respective inlets. Each one of said two flow diverting elements (23) are provided at a respective one of said outlets (28) of said guide elements (21) and are adapted to be adjustable between at least a first and a second position. The present invention also relates to a combine harvester (1) being provided with a spreading arrangement (10).

14 Claims, 6 Drawing Sheets

(56) References Cited

U.S. PATENT DOCUMENTS

| | | | | |
|---|---|---|---|---|
| 8,010,262 B2* | 8/2011 | Schroeder | .......... | A01D 41/1243 |
| | | | | 701/50 |
| 8,210,915 B2* | 7/2012 | Holmen | .................. | A01F 12/40 |
| | | | | 460/112 |
| 8,876,583 B2* | 11/2014 | Roberge | ............. | A01D 41/1243 |
| | | | | 460/111 |
| 9,066,470 B2* | 6/2015 | Ricketts | ............. | A01D 41/1243 |
| 2007/0256403 A1* | 11/2007 | Teroerde | ............ | A01D 41/1243 |
| | | | | 460/100 |
| 2011/0045884 A1* | 2/2011 | Weichholdt | ........ | A01D 41/1243 |
| | | | | 460/112 |
| 2013/0095899 A1 | 4/2013 | Knapp | | |
| 2016/0088794 A1* | 3/2016 | Baumgarten | ........ | A01D 41/127 |
| | | | | 460/1 |

OTHER PUBLICATIONS

Extended European Search Report for European Patent Application No. 15172585.0, dated Dec. 16, 2015, 8 pages.

\* cited by examiner

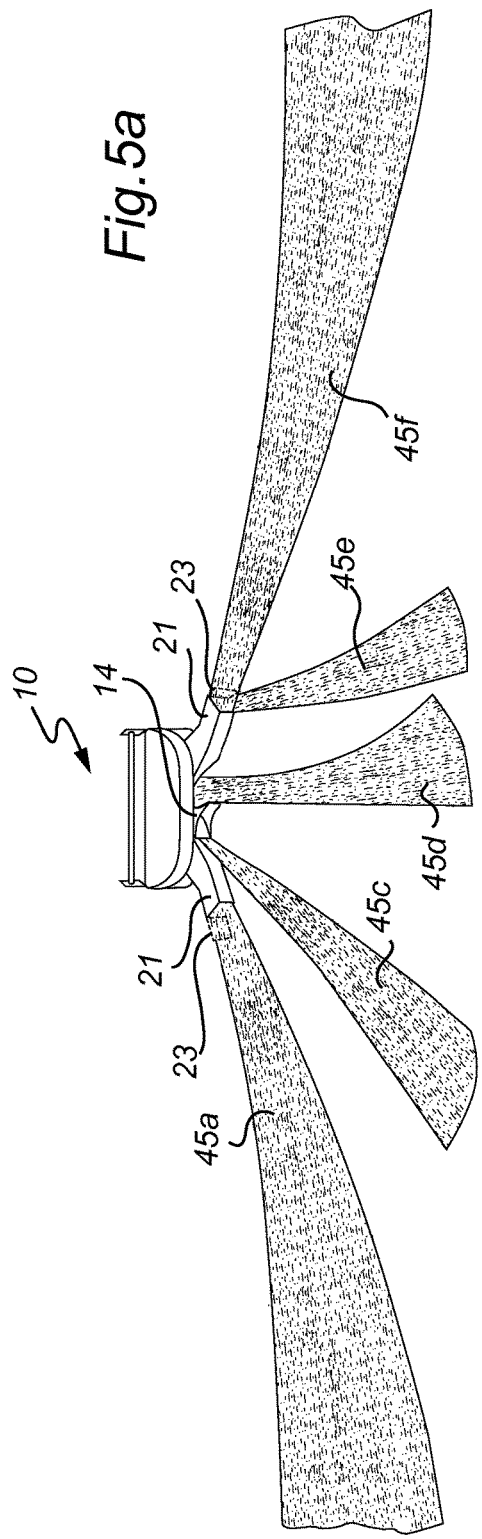
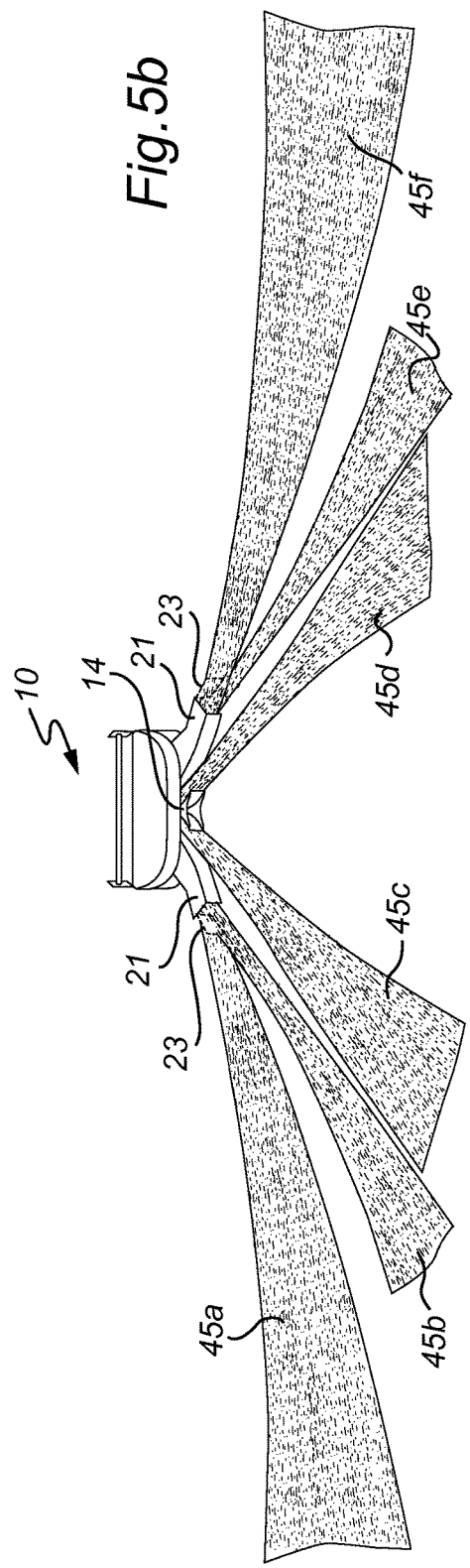

SPREADING ARRANGEMENT AND A COMBINE HARVESTER COMPRISING A SPREADING ARRANGEMENT

This application is a 35 U.S.C. § 371 National Stage application of International Application No. PCT/EP2016/063154, filed on Jun. 9, 2016, which claims the benefit of priority of European Patent Application No. 15172585.0, filed Jun. 17, 2015. The entire contents of all of these applications are incorporated herein by reference.

TECHNICAL FIELD

The present invention relates to a spreading arrangement adapted to be arranged after a combine harvester. It also relates to a combine harvester comprising a spreading arrangement.

BACKGROUND OF THE INVENTION

Agricultural equipment known as combine harvesters or combines is becoming increasingly large and with ever wider cutting tables to enable a field to be threshed in an effective manner. The cutting table is, in itself, essentially wider than the actual harvester. During threshing, crop residues, such as chaff and straw, are generated. The straw may either be collected or distributed on the field. If it is to be distributed on the field, it may either be distributed as it is or be chopped into small pieces in a straw chopper before it and the chaff are distributed on the field to help provide nutrient for forthcoming crops. For a variety of reasons, such as obtaining suitable temperature and moisture gradients for future crops on the field, even insulation of the field and effective use of agricultural chemicals, it is desirable to spread the crop residues behind the combine harvester and to the sides as evenly as possible over a region essentially corresponding to the width of the cutting table. As the cutting tables become wider, it becomes increasingly difficult to spread over the whole of the intended width. In fact, it is necessary to be able to spread crop residue even wider than the cut, in order to compensate for side winds or cross winds affecting the crop residue once it has left the combine harvester. Cross winds can stall any sideways projection of crop residues, resulting in an uneven distribution.

Hence, there exists a need for spreader arrangements that is able to spread crop residues, e.g. chopped or unchopped straw, wider than presently known arrangements. An object of the invention is therefore to provide a spreading arrangement that can spread straw over a wider area than previously know spreading arrangements.

SUMMARY OF THE INVENTION

According to a first aspect, the present invention solves the above-identified and other objectives by providing a spreading arrangement according to claim 1. According to a second aspect, the present invention also solves the above-identified and other objectives by providing a combine harvester according to claim 12.

According to the first aspect of the present invention, a spreading arrangement adapted to be arranged after a combine harvester is provided. Said spreading arrangement comprises two spreader fans, two flow guides, and two flow diverting elements. An inlet of each one of the two flow guides is arranged in proximity to a respective one of said spreader fans, wherein an outlet of said flow guides is provided at a distance from said respective inlets, wherein each one of said two flow diverting elements is provided at a respective one of said outlets of said guide elements and is adapted to be adjustable between at least a first and a second position. Said flow diverting elements are arranged to move in an oscillating frequency between said first and second position and extend such that they are provided in front of at least a portion of the respective outlet when they are in said second position.

A spreading arrangement according to this aspect of the present invention fulfills the above-mentioned and other objectives. The two fans may be used to give the crop residues a desired speed with which it then travels to the flow guides. When the crop residues travel through the flow guides, it is guided in a desired direction, and the crop residues are thereby held together for a longer period as compared to if it had only exited the fans and travelled out in the surrounding air. The flow diverting elements are provided at the outlets of the respective flow guides and may be adjusted between at least a first and a second position. Depending on which position they are placed in, the flow of crop residues is directed in a desired direction over the field. Hence, it is thereby possible to obtain a desired direction and pattern of the spreading of the crop residues.

A spreading arrangement according to this aspect of the present invention may suitably be arranged after a combine harvester. It may e.g. be arranged after a straw chopper of a combine harvester and then spread the chopped straw. It may also be arranged after a combine harvester without a straw chopper and then be used to spread unchopped straw.

The flow guides are suitably arranged downstream of the respective spreader fan, such that crop residues may exit a spreader fan and thereafter travel into a flow guide.

When the flow diverting elements are provided in front of at least a portion of the respective flow guide's outlet, the crop residues will come in contact with the flow diverting element and be diverted to another direction.

According to one exemplary embodiment, said two spreader fans are arranged in a housing.

According to one exemplary embodiment, the rotation speed of the respective spreader fan is arranged to be controlled individually, which makes it possible, for example, to adjust the spreading in dependence on wind conditions.

According to one exemplary embodiment, said flow diverting elements extends in the direction of the respective one of said flow guides when positioned in said first position. Hence, when the flow diverting elements are positioned in the first position, the crop residues will be able to leave the flow guide in the direction of the flow guide's extension.

According to one exemplary embodiment, it is approximately 70-110°, more preferably 80-100° and most preferably approximately 90° between said first and second position of the flow diverting elements.

According to one exemplary embodiment, said oscillating frequency of said flow diverting elements is 50-100 oscillations per minute. With such an oscillation frequency, the direction of the crop residues when leaving the spreading arrangement will be altered approximately one or two times per second. Therefore, the crop residues will be provided in windrows with a zigzag pattern over the field, with short distances between the direction changes of the pattern.

According to one exemplary embodiment, said flow diverting elements are connected to at least one device for imparting a swinging motion to said flow diverting elements. Thereby, the flow diverting elements may be made to oscillate with the desired frequency.

According to one exemplary embodiment, said flow guides comprises a top portion and two side portions, wherein said side portions extend downwards from said top portion and are distanced from each other, such that said flow guide is a channel having a cross-section with the form of an inverted U. Hence, the side portions may be connected on either long side of the top portion.

According to one exemplary embodiment, said flow diverting elements are connected to a side portion of a flow guide. Hence, the flow diverting elements may pivot around a substantially vertical axle.

According to one exemplary embodiment, the outlet of said flow guides are provided at one end thereof, said end being distal from the spreader fans.

According to one exemplary embodiment, the flow guides does not comprise a bottom portion. Providing a flow guide in the form of e.g. a channel with all sides covered increases the risk that crop residues will jam the flow guide, resulting in time-consuming cleaning and reparation operations. With a flow guide not having a bottom portion, a portion of the crop residues will also be able to fall down and land closer to the combine harvester than if it would have exited through the outlet of the flow guide.

According to one exemplary embodiment, the flow guides have a length of 30-140 cm, more preferably 40-100 cm, and most preferably 60-80 cm. The length of the flow guides may be chosen depending on how wide it is desired to spread the crop residues. A longer flow guide makes it possible to spread the crop residues further away from the spreading fans, as the stream of crop residues are held together a longer distance.

According to one exemplary embodiment, the flow guides have a height of 10-40 cm, more preferably 15-30 cm and most preferably of 20 cm. According to one exemplary embodiment, the flow guides have a width of 10-40 cm, more preferably 15-30 cm and most preferably of 20 cm. The dimensions of the flow guides according to these exemplary embodiments have proven to be beneficial in terms of providing sufficient space for the amount of crop residues that should be distributed on the field.

According to one exemplary embodiment, the height of the flow diverting elements is lower than the height of the flow guides. Hence, according to this embodiment, a portion of the stream of crop residue may exit the flow guide in the direction of the flow guide, and not being diverted, even if a flow diverting element is not in the first position. In other words, a portion of the stream of crop residues will be able to pass over the flow diverting elements even if it is partially blocking the outlet of a flow guide.

According to one exemplary embodiment, the height of said flow diverting elements, in relation to the respective flow guide, are individually adjustable. Hence, according to this embodiment, it is possible to adjust the height of the two flow diverting elements in relation to the respective flow guide. It is for example conceivable that one or more portions of the flow diverting elements may be removed or added to the flow diverting element, and thereby its height becomes altered. It is also conceivable that no portions are added or removed, and instead the upwards-downwards position of said flow diverting elements, in relation to the respective flow guide, are individually adjustable. With either of these two embodiments, it is possible to determine how large portion of the stream of crop residues that it should be able to divert, and how much that should be able to pass over or under the flow diverting elements.

According to one exemplary embodiment, it is possible to adjust the position of the flow diverting element in the vertical direction during use of the spreading arrangement.

According to one exemplary embodiment, it is possible to adjust the position of the flow diverting element in the vertical direction when the spreading arrangement is not in use. Hence, in this embodiment, a manually operated height adjusting arrangement may be provided. Such an arrangement may e.g. be adding or removing portions of the flow diverting elements, or changing the vertical position of the flow diverting elements by e.g. fastening it in a suitable one of vertically distanced holes in the flow guide.

According to one exemplary embodiment, the flow diverting elements comprises a solid plate, which is pivotally fixed to one side of said flow guides.

According to one exemplary embodiment, the flow diverting elements comprises bars, which are distanced from each other and pivotally provided to one side of said flow guides. The bars may be substantially horizontally extending and may be provided to said flow guide by means of a holder element. By providing the bars with a distance to each other, parts of the stream of crop residues may pass between the bars, and hence, not be diverted by the flow diverting elements. With substantially horizontally extending is meant to understand that their extension is deviating up to 10° from the horizontal plane, either upwards or downwards when the spreading arrangement in is placed in its intended position of use.

According to one exemplary embodiment, the bars of the flow diverting elements has an extension that deviates up to 45° from the horizontal plane, either upwards or downwards, more preferably 25° from the horizontal plane, either upwards or downwards, and most preferably 15° from the horizontal plane, either upwards or downwards, when the spreading arrangement in is placed in its intended position of use.

According to one exemplary embodiment, said bars are individually fastened to a holder element. Hence, it is in this embodiment possible to remove one or more of the bars, or add more bars and thereby adjust the height of the flow diverting elements.

According to one exemplary embodiment, said flow diverting elements comprises 1-5 bars and more preferably 2-4 bars.

According to one exemplary embodiment, said flow guides extend in a direction that is backwards of a combine harvester, when the spreading arrangement is provided to a combine harvester.

According to one exemplary embodiment, said flow guides extend in a respective backwards and outwards direction, when said spreading arrangement is arranged to a combine harvester. By providing the flow guides to extend in backwards and outwards direction, as seen in relation to a combine harvester, the crop residues will be spread outwards and backwards. As it is desirable to improve the spreading of crop residues out from the sides of the combine harvester, it is beneficial to provide the flow guides with their general extension outwards and backwards.

According to one exemplary embodiment, the flow guides has an angle in relation to the longitudinal axis of the travel direction of a combine harvester that is between 45°-90°, and more preferably 60°-90°, and most preferably 70°-80° in the outwards direction of the combine harvester.

According to one exemplary embodiment, the spreader fans are substantially horizontal, when they are provided in their intended use position. With substantially horizontal is meant to understand that they have an angle in relation to the horizontal plane that is less than 10°. As the spreader fans should direct the straw backwards, they are, if they have an angle to the horizontal plane, preferably provided such that their rearmost part is provided lower than their foremost part.

According to one exemplary embodiment, said flow guides are substantially horizontal, when the flow guides are provided in their intended use position. With substantially horizontal is meant to understand that they have an angle in relation to the horizontal plane that is less than 10°. As the flow guides should guide the straw backwards and outwards, they are, if they have an angle to the horizontal plane, preferably provided such that their rearmost part is provided lower than their foremost part.

According to one exemplary embodiment, the flow guides and the spreader fans have the same inclination to the horizontal plane.

According to one exemplary embodiment, said flow guides are fixed in relation to the spreader fans. Providing fixed flow guides, with a desired direction of extension, is beneficial as it simplifies both the use of the device as well as the manufacturing of it.

According to one exemplary embodiment, the direction of the extension of said flow guides may be adjusted. By providing adjustable flow guides, it is possible to control the spreading of the crop residues even further.

According to one exemplary embodiment, said spreading arrangement further comprises a spreading member, wherein said spreading member is wedge shaped and is disposed between and downstream of said two spreader fans. Providing a spreading member to the spreading arrangement further improves the possibilites to spread crop residues in a desired manner.

According to one exemplary embodiment, said spreading member is provided at least partly between the two spreader fans.

According to one exemplary embodiment, said spreading member is pivotable around a shaft between a first outer position and a second outer position, and wherein said spreading member is adapted to move in an oscillating frequency between the first outer position and the second outer position. A pivoting spreading member will spread the crop residues in windrows with a zig-zag pattern, which is beneficial as it provides for an even distribution of the the crop residues on a field.

According to one exemplary embodiment, the oscillating frequency is 50-100 oscillations per minute.

According to one exemplary embodiment, said spreading member is connected to at least one device for imparting a swinging motion to said spreading member. Thereby, the spreading member may be made to oscillate with the desired frequency.

According to one exemplary embodiment, the device for imparting a swinging motion to the spreading member is the same device for imparting a swinging motion to the flow diverting elements.

According to one exemplary embodiment, the spreading member and the flow diverting elements are provided to oscillate with the same frequency.

According to one exemplary embodiment, said spreading member includes two vertical sides and a shaft, said vertical sides are arranged at an angle to each other.

According to one exemplary embodiment, said vertical sides are straight.

According to one exemplary embodiment, said vertical sides are concavely curved.

According to one exemplary embodiment, the two spreader fans are spaced apart from each other at a distance that is shorter than a distance between ends of the two vertical sides that are opposite to other ends of the two vertical sides that meet together of the wedge shaped spreading member.

According to one exemplary embodiment, the ends of the two vertical sides that meet together and the shaft are positioned downstream of a center line of the two spreader fans. Thereby, the spreading member may control the spreading of straws after the straws have left the two spreader fans.

According to one exemplary embodiment, said spreading member is a V-shaped plate.

According to one exemplary embodiment, the spreading member is arranged and configured such that an apex of said spreading member is to be placed forwards as seen in a direction of the combine harvester, when the spreading arrangement is arranged to the combine harvester.

According to one exemplary embodiment, said spreading member further comprises a plate, which is connected to said vertical sides of the spreading member.

According to one exemplary embodiment, an adjustable closing element is provided between each one of said two spreader fans and said spreading member. Thereby, it is possible to control how much of the flow from the spreader fans that is directed to the spreading element, and how much that is directed to the respective flow guides.

According to one exemplary embodiment, the adjustable closing element comprises an opening and a plate, which plate may be provided in different positions in relation to the opening, such that the size of the opening is adjusted.

According to a second aspect of the present invention, a combine harvester comprising a spreading arrangement according to the first aspect of the present invention is provided.

According to one exemplary embodiment, said combine harvester comprises a straw chopper, having an inlet for unchopped straw, and an outlet for chopped straw, and wherein said spreading arrangement is arranged downstream of said outlet for chopped straw.

According to one exemplary embodiment, said combine harvester further comprises at least one device for imparting a swinging motion to said spreading member and/or said flow diverting elements. Hence, according to this embodiment, the same device may be used for imparting a swinging motion to both said spreading member and said flow diverting elements. However, it is also conceivable with an exemplary embodiment in which one device is provided for imparting a swinging motion to said spreading member, and a different device is provided for imparting a swinging motion to the two flow diverting elements. It is also conceivable with an embodiment in which there are two different devices provided for imparting a swinging motion to either one of said flow diverting elements.

According to one exemplary embodiment, the swinging motion of the spreading member and/or the flow diverting elements may be adjustable.

According to one exemplary embodiment, said device for imparting a swinging motion to said spreading member and/or flow diverting elements includes a flywheel having an eccentrically disposed link. According to this embodiment and in order to be able to adjust the swinging motion of the spreading member and/or the flow diverting elements, the rotation of said flywheel is adjustable. If the spreading member and/or one or both of the flow diverting elements should be individually adjustable, two or more devices having a flywheel and an eccentrically disposed link may be provided.

BRIEF DESCRIPTION OF THE DRAWINGS

The above, as well as additional, objects, features and advantages of the present invention will be better understood through the following illustrative and non-limiting detailed description of exemplary embodiments of the present invention, with reference to the appended drawings, wherein:

FIGS. 5a and 5b illustrate a spreading arrangement according to the present invention in use.

DETAILED DESCRIPTION OF THE DRAWINGS

Figure 1:
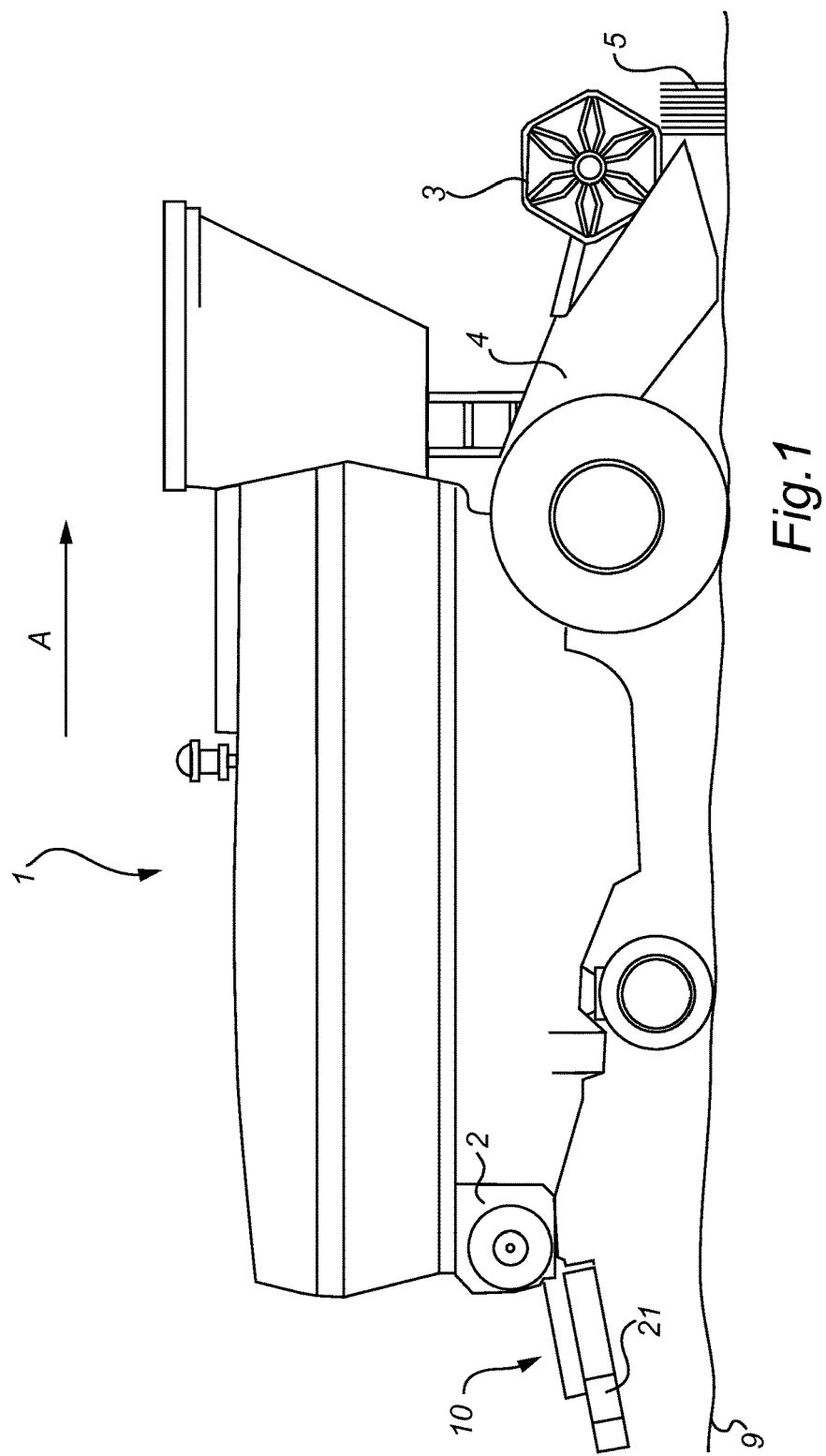
FIG. 1 shows in side view a combine harvester having a spreading arrangement according to the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout the description.

Figure 2A:
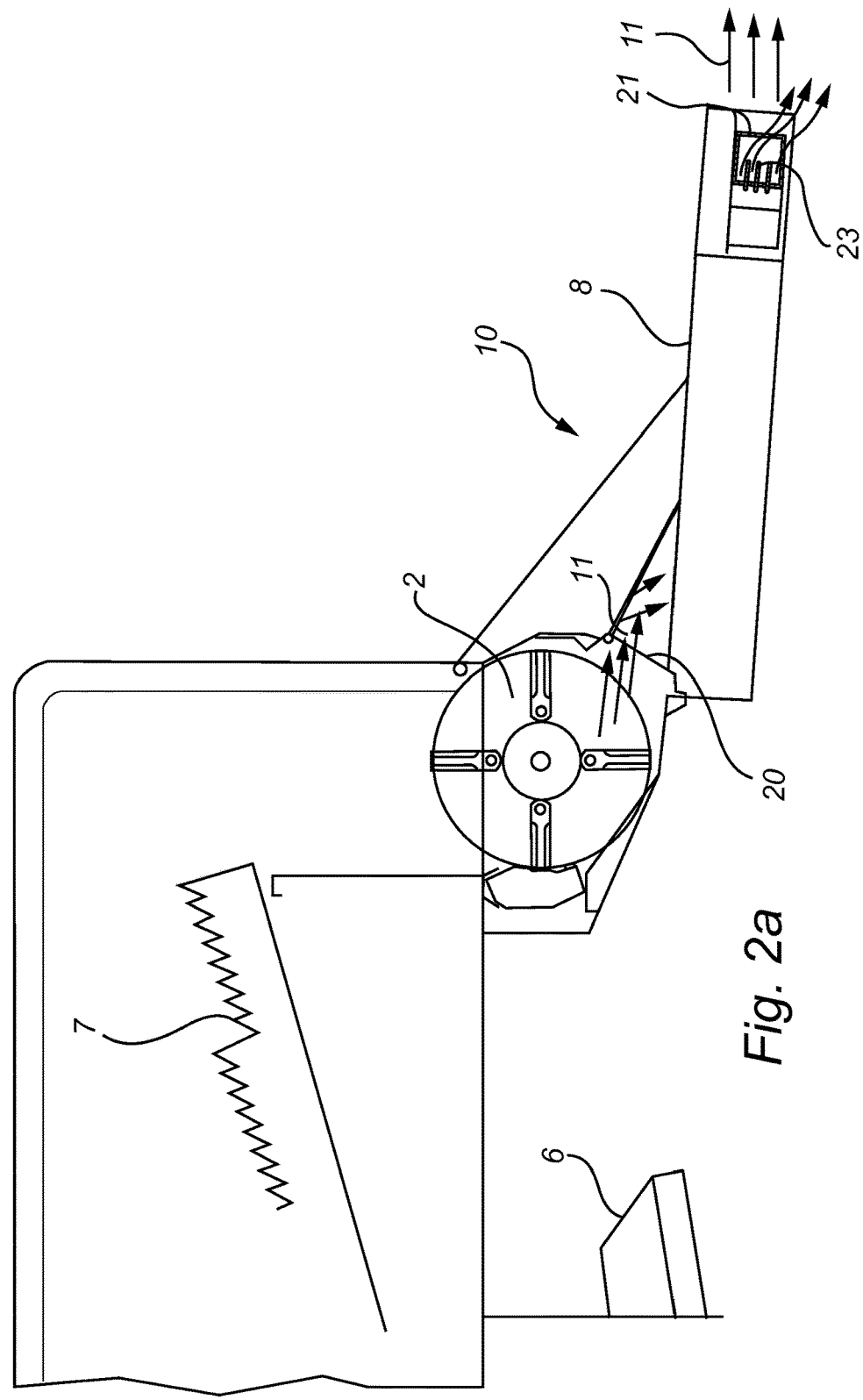
FIG. 2a shows in sectioned side view the rear part of the combine harvester in FIG. 1, which combine harvester is provided with a straw chopper.

The combine harvester 1 shown in FIG. 1 is of otherwise conventional type, having a cutting table 4 with a pick-up drum 3 for gathering up straw forage 5. The cutting table 4, together with the pick-up drum 3, is 9 m and above in width, e.g. up to 12 m, which nowadays is becoming increasingly common so as to allow a field 9 to be harvested quickly and effectively. Within the combine harvester 1 there are then devices for separating grain from stems (straw), chaff and other crop residues. These devices comprise, for example, a sieve 6 (see FIG. 2a) for sifting out chaff from grain, a straw shaker 7 (se FIG. 2a) for guiding straw rearwards in the direction of travel of the combine harvester 1, and a collecting bin (not shown) for the separated grain.

In this patent application, a reference to the directions "behind" and "in front of" relates to a position behind and in front, as seen in the normal forward-directed direction of travel A of the combine harvester 1. Also "rearwards" relates to a direction towards the back of the combine harvester, and "outwards" relates to a direction out from the combine harvester, in a sideways direction.

In the rear part of the combine harvester 1 sits a straw chopper 2. The straw chopper 2 is of conventional type and is arranged vertically below the rear end of the straw shaker 7. The straw chopper 2 has the task of chopping the straw if it is not to be windrowed for subsequent collection, but is instead to be spread evenly over the field 9. If the straw is chopped into smaller pieces, it is more easily ploughed back into the ground and does not stick as easily in a plough. Furthermore, it is more easily broken down and forms mull and contributes with nutrients to the next crop. It is therefore important that the spreading of the straw is even over the field and over a width corresponding to the cut width represented by the cutting table 4. Furthermore, it may sometimes be desired to spread straw over a width that is twice the width of the cutting table. Therefore, in certain circumstances, it is desirable to be able to spread over a width of up to 24 meters.

After the straw chopper 2, a spreading arrangement 10 according to an embodiment of the present invention is provided. The spreading arrangement is better seen in FIGS. 3 and 4 and comprises two spreader fans 8, two flow guides 21, and two flow diverting elements 23.

The two spreader fans 8 have the task of spreading the straw in the above-stated manner. Previous combine harvesters 1 of narrower width have not needed these, since the straw chopper 2, in the chopping operation, has given the straw sufficient velocity, or kinetic energy, to be spread over the intended width. With the new wider combine harvesters 1, this kinetic energy is insufficient, but rather additional velocity is given to the straw in the spreader fans 8. In the illustrated embodiment of the invention, the spreader fans 8 are arranged on one level vertically below and behind the straw chopper 2. The arrows 11 represent the path of the chopped straw from the straw chopper 2 and into the spreader fans 8, and out of the spreader fans 8 through the flow guides 21 and through another outlet that will be described further below.

Figure 2B:
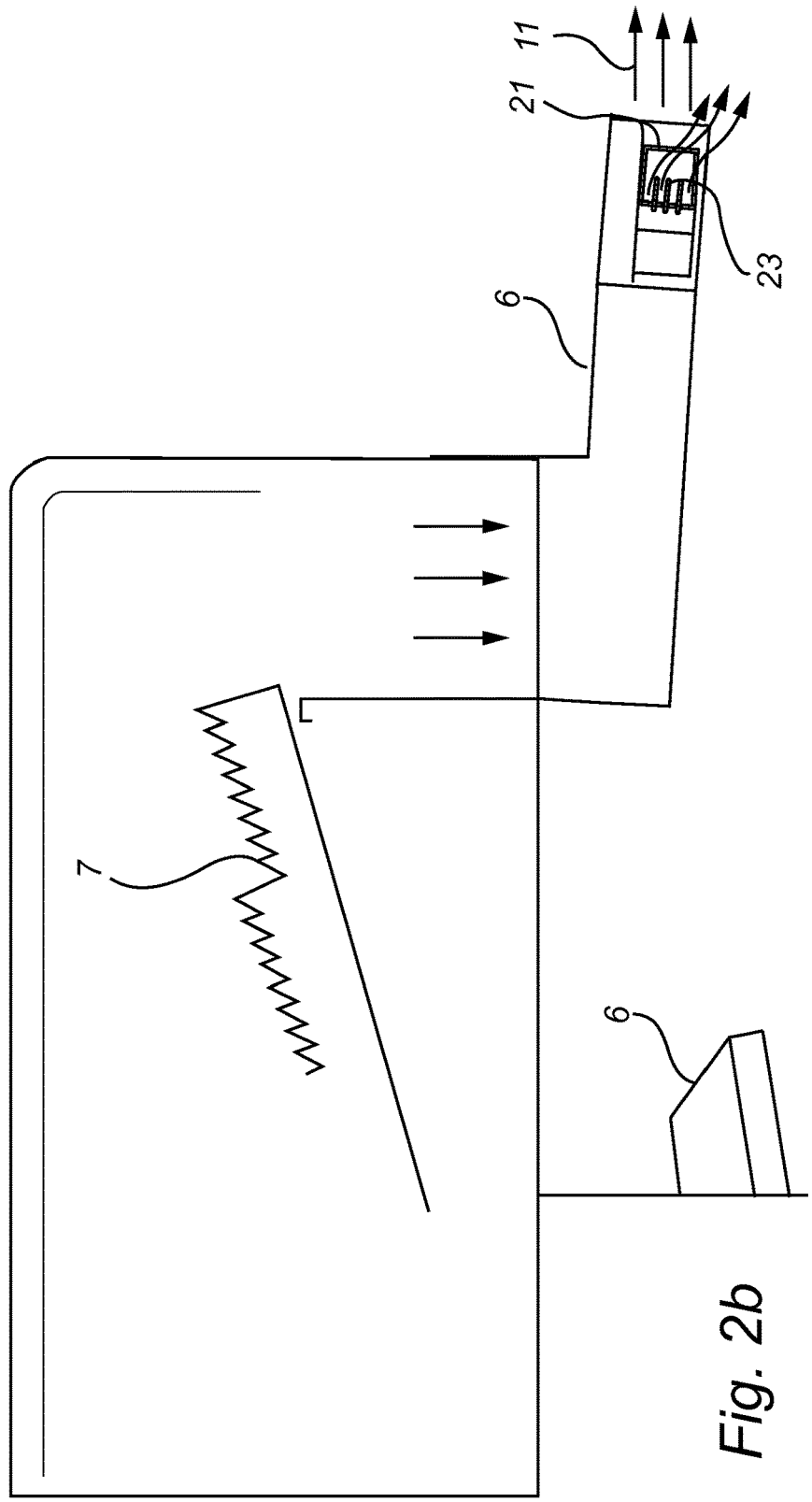
FIG. 2b shows in sections side view the rear part of a combine harvester having a spreading arrangement according to the present invention, the combine harvester not having a straw chopper.

FIG. 2b illustrates in sections side view the rear part of a similar combine harvester, with the difference that it does not have a straw chopper. Similar to the embodiment illustrated in FIGS. 1 and 2a, the sieve 6 sifts out chaff from grain the straw shaker 7 guides straw rearwards in the direction of travel of the combine harvester 1. The difference is that the straw is not chopped and instead is spread over the field in a non-chopped state by the spreading arrangement 10.

Figure 3:
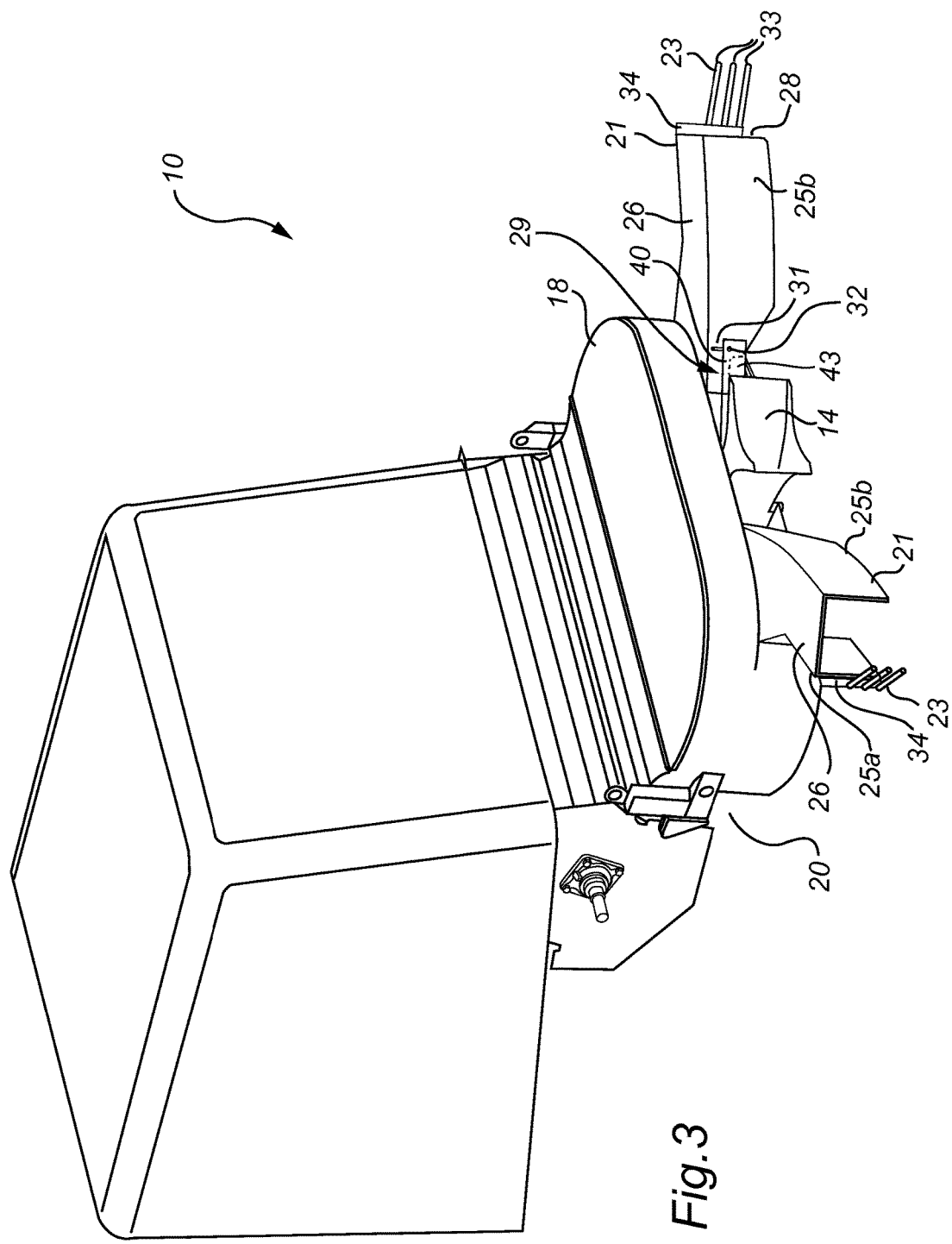
FIG. 3 shows in perspective view a spreading arrangement according to the present invention.
Figure 4:
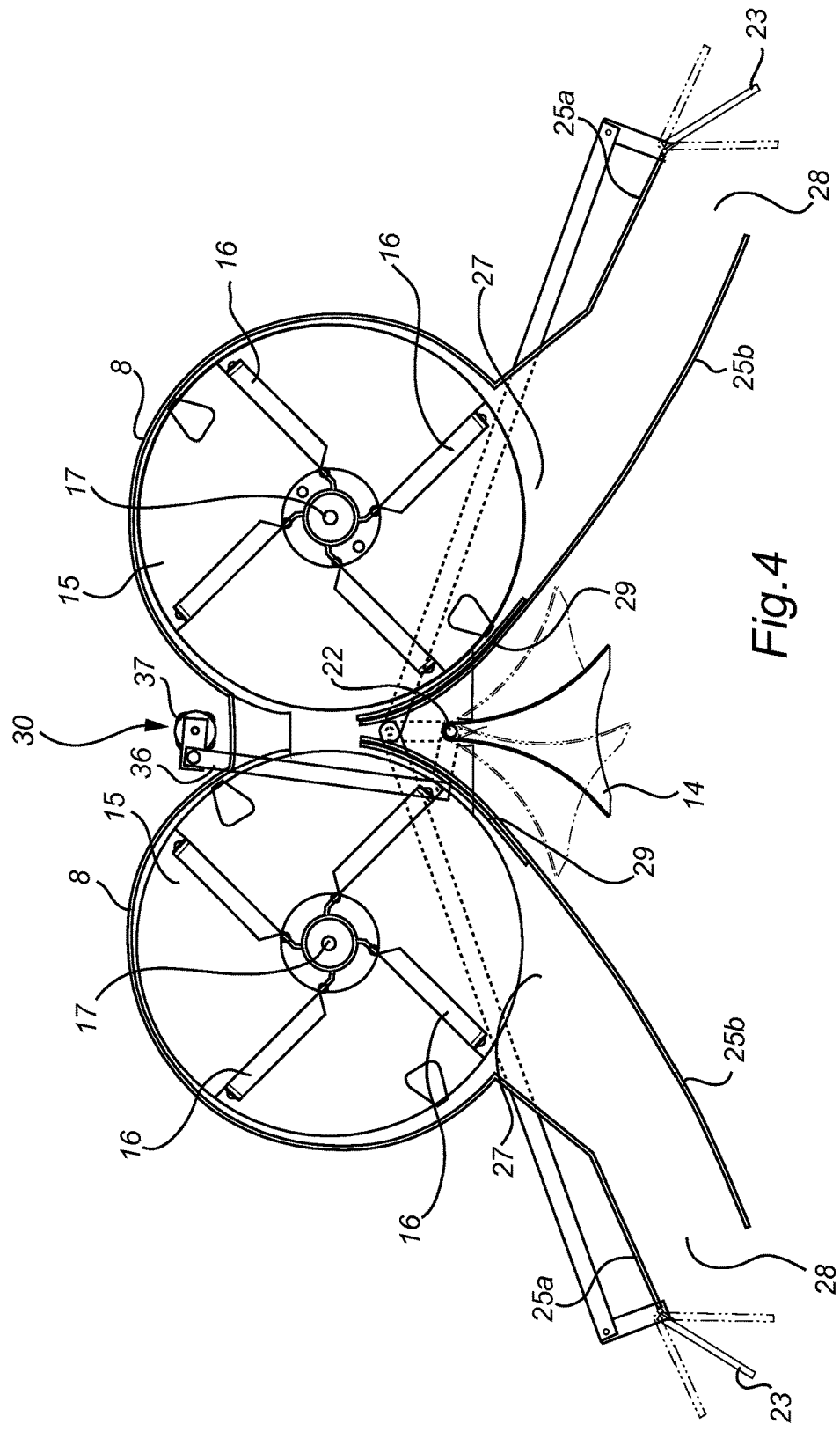
FIG. 4 shows in cross-sectional a spreading arrangement according to the present invention.

FIG. 3 shows a perspective view of the spreader arrangement 10, and FIG. 4 shows a cross-sectional view of the spreader arrangement 10 in order to illustrate both how it is arranged and how it functions. The spreader fans 8 sit side by side and in the same plane and are provided to be counter-rotating. In this embodiment, the left hand fan in FIG. 4 is provided to rotate clock-wise and the right hand fan is provided to rotate counter-clockwise. They each sit suspended about a respective essentially vertical shaft 17. Each of the fans comprises four fan blades 16, which extend radially outwards from the shaft 17, and in their lower axial plane, as seen in the vertical direction, a disc 15 is disposed at the respective bottom edges of the fan blades 16. During use a cover 18 is provided. An opening 20 in this cover is present in the front edge of the cover and therefore the edge facing towards the straw chopper 2. This opening 20 forms an inlet 20 for chopped straw.

Adjacent the two spreader fans 8, a respective left and right flow guide 21 is provided. The flow guides comprises respective outer and inner side portions 25a, 25b and a respective top portion 26. The flow guides 21 has an extension that is directed backwards and outwards, as seen in relation to the combine harvester. The outer side portions 25a have a somewhat longer extension than the inner side portions 25b. An inlet 27 to each of the flow guides 21 is provided adjacent either one of the fans 8, such that the stream of straw is directed into a respective flow guide. The stream of straw thereby follows the flow guide to the respective outlet 28 where it becomes spread over the field 9. Adjacent the inlets 27 of each of the flow guides, a respective adjustable closing element 29 is provided on the respective inner side portions 25*b*. The purpose of these adjustable closing elements 29 will be explained further below.

At a respective one of the outer side portions 25*a*, the flow diverting elements 23 are provided. Each flow diverting element 23 comprises in the illustrated embodiment three horizontally arranged bars 33, which in the illustrated embodiment has a diameter of approximately 10 mm and are distanced from each other. The bars are individually fastened to a pivotable holder 34. By adding more bars 33 or removing any of the bars 33, the height of the flow diverting element may be adjusted.

The flow diverting elements are connected to a device 30 for imparting a swinging motion to the flow diverting elements 23, such that the flow diverting elements are arranged to pivot around their connection to the respective flow guides. The flow diverting elements 23 are arranged to pivot from a first position to a second position, shown with broken lines in FIG. 4. In the first position, the flow diverting element has an extension substantially in the direction of the outer side portion 25*a* of the flow guide 21. Hence, in this position, the flow diverting element does not block the outlet 28. In the second position, which is provided at an angle of approximately 90° in relation to the first position, the flow diverting element 23 partially blocks the outlet 28. However, as the outer side portion 25*a* extends further away from the fan 8 than the inner side portion 25*b*, the outlet 28 is not completely blocked. As can be best seen in FIG. 3, the height of the flow diverting elements 23 is lower than the height of the flow guides 21.

The device 30 for imparting a swinging motion in this embodiment comprises a flywheel 37 that is rotationally driven in a known but non-illustrated manner, for example via a belt drive. A link system 36 is eccentrically disposed on the flywheel 37 such that a rotation of the flywheel 37 is converted by the link system 36 into a swinging motion of the flow diverting elements 23. The rotation of the flywheel 27 can be adjusted such that the frequency is suitable for the intended use. In the illustrated embodiment, a frequency of 50-100 oscillations per minute has proven to be suitable.

As the flow diverting elements 23 in this embodiment are connected to the same flywheel 37 and link system 36, one of the flow diverting elements will be in the first position when the other flow diverting element is in the second position. This is also seen in FIGS. 5*a* and 5*b*, illustrating the spreading of straw with a spreading device according to the present invention.

In FIGS. 3 and 4 there is also illustrated a spreading member 14, which is placed between the spreader fans 8, essentially on the line of symmetry between them and behind the point where the spreader fans 8 are placed closest together. The spreading member 14 is arranged as a V-shaped or wedge-shaped plate, with its apex placed forwards and pivotally suspended about a shaft 22. The angle of the plate is formed by the legs of the V and is fixed and adjusted to contribute to form the spreading pattern, which will be described in greater detail below. In the illustrated embodiment, the sides of the plate are flat in the vertical direction and slightly concave rearwards along its legs, and at least partially follow the curvature of the periphery of the spreader fans 8. For stabilization of the spreading member 14, the two sides represented by the legs of the V are connected to a further plate. In FIG. 4, the spreading member 14 is shown with dashed lines in its outer positions, between which outer positions it is arranged to swing.

The spreading member 14 is in this embodiment also connected to the link system 36 so that the spreading member can pivot about its shaft 22 at the same frequency as the flow diverting elements.

The adjustable closing elements 29 of the flow guides 21 are provided in order for an operator to determine how large amount of the flow of straws that should be spread through the flow guides and how much that should be provided to the spreading member 14. Each of the adjustable closing elements 29 comprises a plate 40, oblong openings 31, and fastening means 32 extending through a hole in the plate 30. The plate 30 is provided to cover an opening 43. The oblong openings are oblong in the vertical direction and the height of the plate 30 in relation to the opening 33 may thereby be adjusted and the plate fastened at a desired height by means of the fastening means 32. Any suitable fastening means, such as screws, pins, nails, bolts and nuts, etc. may be used. Depending on the position of the plate 30 in front of the opening 43, a desired amount of the stream of crop residues may be provided to the spreading member 14.

The working of the spreading arrangement 10 will now be described in greater detail. Unchopped straw is guided rearwards in the combine harvester 1 with the aid of the straw shaker 7 and tumbles down into the straw chopper 2. There it is cut by means of knives into smaller pieces of chopped straw. The straw chopper 2 gives the chopped straw a certain velocity rearwards in an essentially horizontal direction, as is illustrated in FIG. 2 by the arrows 11. It is thereafter guided into the spreader fans 8 through the inlet 20 thereof. The spreader fans 8 give the chopped straw additional velocity in the rearward direction. A desired portion of the chopped straw will be guided through the flow guides harvester. When the chopped straw exits through the outlet 28 it will be spread in a direction according to the position of the flow diverting elements. If the flow diverting element is in the first position, the straw will be spread in the direction of the flow guide's extension. However, if the flow diverting element is somewhere between the first and second position, a portion of the stream of straw will bounce on the flow diverting element 23 and be diverted such that it is spread more in the backwards direction and less in the sideways direction. When the flow diverting element is in the second position, a portion of the stream of straw will be spread approximately straight behind the combine harvester. Also, as the height of the flow diverting elements 23 is lower than the height of the flow guides 21, a portion of the stream of straw will be able to pass over the flow diverting elements 23, and thereby be ejected outwards and rearwards, instead of only rearwards, from the combine harvester, even if the flow diverting elements are in the second position. In order further to improve the spreading of the chopped straw over the field 9, at least a part of the straw may be guided to the spreading member 14, through the adjustable closing elements 29.

The flow diverting elements 23 and the spreading member 14 can also conceivably swing more towards its one outer position, if the weather conditions or other factors make this appropriate. In an extreme case, it can be set in a fixed position.

FIGS. 5*a* and 5*b* show schematically how the chopped straw is spread over the field 9. The fact that the spreading of the straw is affected by the flow guides 21, the flow diverting elements 23 and the spreading member 14 after the straw has left the spreader fans 8 in an oscillatory swinging motion over the field 9, is represented by the schematized windrows 45*a*-45*f*, with up to three windrows from each spreader fan 8. With the flow guides and the flow diverting elements according to the present invention, which is both simple and lightweight, the oscillation can be made faster and can hence spread the straw better. A large number of oscillatory motions of the flow diverting elements 23 and also the spreading member 14 means that two corresponding positions of the schematic windrows 45a-45f can come very close together. In FIG. 5a, a situation is illustrated in which the left hand side flow diverting element is in the first position, and the straw from the left hand side flow guide is thereby distributed in the direction of the flow guide's extension in a windrow 45a. A portion of the stream of straw, from each spreader fan 8, is directed to the spreading member 14 and two windrows 45c, 45d are provided behind the spreading member 14. However, as the spreading member 14 is connected to the same device for imparting a swinging motion, it is in its outer position to the left. Therefore, the windrow 45c is much thinner than the windrow 45d closest to the spreading member. The flow diverting element of the right hand side flow guide is in the second position, and a part of the stream of straw from that flow guide is directed more directly backwards in a windrow 45e. However, as the flow diverting element does not extend over the entire height of the flow guide, a part of the stream of straw from the right hand side flow guide will also be spread in a windrow 45f.

FIG. 5b illustrates the situation when both flow diverting elements 23 are in a position between the first and second position. Thereby, the stream of straw exiting either one of the flow guides will be partly diverted by the respective flow diverting element and partly not diverted because of the lower height of the flow diverting elements as compared to the height of the flow guides. Therefore, there are two windrows of straw behind each flow guide, namely windrows 45a, 45b behind the left hand flow guide and windrows 45e, 45f behind the right hand flow guide. As the spreading member 14 is connected to the same device for imparting a swinging motion as the flow diverting elements, it is also positioned substantially in the middle of its swinging positions. Therefore, the windrows 45c, 45d are of substantially equal size closest to the spreading member.

The above-described embodiments are not limited to the concept of the invention, but describe only the currently preferred embodiments. Other differences are the type of combine harvester 1 and straw chopper 2, which, in itself, does not have any major bearing upon the present invention. For example, instead of a straw shaker 7 there can be rotors. Furthermore, the full width of the whole of the spreader fans 8 does not necessarily need to be utilized, but rather a greater part of the chopped straw can be fed into them towards the line of symmetry should this be deemed advantageous. The use of just one spreader fan 8 may also be envisaged. Furthermore, it is conceivable to place the spreader fans 8 above the outlet 21 of the straw chopper 2 instead of below.

Also, the present invention has been described in relation to a combine harvester having a straw chopper. It is however also conceivable with utilizing the present invention for spreading unchopped straw from a combine harvester as the one disclosed in FIG. 2b.

The present invention has been described in relation to a spreading arrangement also comprising a spreading member 14. It is however not necessary and the inventive spreading arrangement comprising spreader fans, flow guides and flow diverting elements functions well also without the spreading member.

It is also conceivable with sides of the spreading member side plates that are flat also in the rearwards direction.

It is also conceivable to use any other suitable means than the described flywheel and link system for imparting a swinging motion to the flow diverting elements and the spreading member.

Furthermore, it is not necessary that the flow diverting elements comprises three vertically extending bars. More or fewer bars are also conceivable, as well as embodiments in which they instead comprises e.g. a plate.

Furthermore, the spreader fans has been described as having four fan blades. It is however conceivable with embodiments in which they comprise fewer or more blades, for example three, five or six blades.

Furthermore, any reference signs in the claims should not be construed as limiting the scope.

The invention claimed is:

1. A spreading arrangement adapted to be arranged after a combine harvester, said spreading arrangement comprising:
    two spreader fans,
    two flow guides, and
    two flow diverting elements,
    wherein an inlet of each one of the two flow guides is arranged in proximity to a respective one of said spreader fans, wherein an outlet of said flow guides is provided at a distance from said respective inlets, wherein each one of said two flow diverting elements is provided at a respective one of said outlets of said guide elements and is adapted to be adjustable between at least a first and a second position;
    wherein said flow diverting elements are arranged to move in an oscillating frequency between said first and second position;
    wherein said flow diverting elements extend such that they are provided in front of at least a portion of the respective outlet when they are in said second position, wherein said spreading arrangement further comprises a spreading member disposed between and downstream of said two spreader fans; and
    wherein an opening is provided between each one of said two spreader fans and said spreading member.

2. A spreading arrangement according to claim 1, wherein said flow diverting elements extend in the direction of the respective one of said flow guides when positioned in said first position.

3. A spreading arrangement according to claim 1, wherein said oscillating frequency of said flow diverting elements is 50-100 oscillations per minute.

4. A spreading arrangement according to claim 1, wherein said flow guides comprises a top portion and two side portions, wherein said side portions extend downwards from said top portion and are distanced from each other, such that said flow guide is a channel having a cross-section with the form of an inverted U.

5. A spreading arrangement according to claim 1, wherein a height of the flow diverting elements is lower than a height of the flow guides.

6. A spreading arrangement according to claim 1, wherein a height of each of the flow diverting elements, in relation to the respective flow guide, is adjustable.

7. A spreading arrangement according to claim 1, wherein said flow guides extend in a respective backwards and outwards direction, when said spreading arrangement is arranged to a combine harvester.

8. A spreading arrangement according to claim 1, wherein said spreading member is wedge shaped.

9. A spreading arrangement according to claim 8, wherein said spreading member is pivotable around a shaft between a first outer position and a second outer position, and wherein said spreading member is adapted to move in an oscillating frequency between the first outer position and the second outer position.

10. A spreading arrangement according to claim 8, wherein an adjustable closing element is provided between each one of said two spreader fans and said spreading member.

11. A combine harvester comprising the spreading arrangement according to claim 1.

12. A combine harvester according to claim 11, said combine harvester comprising a straw chopper, having an inlet for unchopped straw, and an outlet for chopped straw, and wherein said spreading arrangement is arranged downstream of said outlet for chopped straw.

13. A combine harvester according claim 11, wherein said combine harvester further comprises at least one device for imparting a swinging motion to said spreading member and/or said flow diverting elements.

14. A combine harvester according to claim 11, wherein said device for imparting a swinging motion to said shaft includes a flywheel having an eccentrically disposed link.

\* \* \* \* \*